(12) United States Patent
Tratzky et al.

(10) Patent No.: US 9,643,882 B2
(45) Date of Patent: May 9, 2017

(54) BOROSILICATE GLASS HAVING IMPROVED HYDROLYTIC RESISTANCE FOR PREFERRED USE IN THE PHARMACEUTICAL SECTOR

(71) Applicant: SCHOTT AG, Mainz (DE)

(72) Inventors: Stephan Tratzky, Neustadt/Wn. (DE); Christof Kass, Tirschenreuth (DE); Rainer Eichholz, Frankfurt am Main (DE); Peter Nass, Mainz (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/263,653

(22) Filed: Apr. 28, 2014

(65) Prior Publication Data

US 2014/0323287 A1   Oct. 30, 2014

(30) Foreign Application Priority Data

Apr. 26, 2013   (DE) .......................... 10 2013 207 634

(51) Int. Cl.

| C03C 3/091 | (2006.01) |
|---|---|
| C03C 3/093 | (2006.01) |
| C03C 4/20 | (2006.01) |
| C03C 3/11 | (2006.01) |
| C03C 3/118 | (2006.01) |
| A61J 1/00 | (2006.01) |
| A61J 1/06 | (2006.01) |

(52) U.S. Cl.
CPC .............. *C03C 3/093* (2013.01); *C03C 3/091* (2013.01); *C03C 3/11* (2013.01); *C03C 3/118* (2013.01); *C03C 4/20* (2013.01); *A61J 1/00* (2013.01); *A61J 1/065* (2013.01)

(58) Field of Classification Search
CPC ........... C03C 3/091; C03C 3/093; C03C 4/20
See application file for complete search history.

(56) References Cited

U.S. PATENT DOCUMENTS

| 3,942,992 A | 3/1976 | Flannery |
|---|---|---|
| 4,386,164 A | 5/1983 | Moser |
| 2003/0087745 A1* | 5/2003 | Peuchert et al. ................. 501/66 |
| 2004/0176237 A1* | 9/2004 | Ott et al. ......................... 501/66 |

FOREIGN PATENT DOCUMENTS

| CN | 101182115 A | * | 5/2008 |
|---|---|---|---|
| CN | 101759360 A | * | 6/2010 |
| DE | 3722130 A1 | | 1/1989 |
| DE | 4430710 C1 | | 5/1996 |
| DE | 19536708 C1 | | 10/1996 |
| DE | 19842942 A1 | | 4/2000 |
| DE | 10035801 A1 | | 2/2002 |
| DE | 10027699 A1 | | 4/2002 |
| DE | 10025465 A1 | | 8/2002 |
| DE | 10238930 C1 | | 11/2003 |
| DE | 10337362 A1 | | 3/2004 |
| DE | 10238915 B3 | | 4/2004 |
| DE | 202010014985 U1 | | 12/2010 |
| EP | 0765847 A1 | | 4/1997 |
| JP | 04074731 A | * | 3/1992 |
| JP | 2014169209 A | * | 9/2014 |

OTHER PUBLICATIONS

Machine Translation of CN 101182115 A, May 21, 2008.*

* cited by examiner

*Primary Examiner* — Elizabeth A Bolden
(74) *Attorney, Agent, or Firm* — Ohlandt, Greeley, Ruggiero & Perle, LLP (57) ABSTRACT

Borosilicate glasses, preferably for use in the pharmaceutical sector, are provided. The borosilicate glasses are outstandingly suitable for the use as pharmaceutical primary packaging, such as phials or ampoules, since the aqueous or water-containing medicaments kept in the containers do not attack the glass significantly, and so the glass releases no, or only few, ions. The borosilicate glasses have the following composition in % by weight or consist thereof:

| | |
|---|---|
| $SiO_2$ | 71-77; |
| $B_2O_3$ | 9-12; |
| $Al_2O_3$ | 5.5-8; |
| $Na_2O$ | 6-8; |
| $K_2O$ | 0.1-0.9; |
| $Li_2O$ | 0-0.3; |
| CaO | 0-1.5; |
| BaO | 0-1; |
| F | 0-0.3; |
| Cl- | 0-0.3; and |
| MgO + CaO + BaO + SrO | 0-2. |

22 Claims, 1 Drawing Sheet

BOROSILICATE GLASS HAVING IMPROVED HYDROLYTIC RESISTANCE FOR PREFERRED USE IN THE PHARMACEUTICAL SECTOR

CROSS REFERENCE TO RELATED APPLICATIONS

This application claims benefit under 35 U.S.C. §119(a) of German Patent Application No. 10 2013 207 634.7, filed 26 Apr. 2013, the entire contents of which are incorporated herein by reference.

BACKGROUND OF THE INVENTION

1. Field of the Invention

The invention relates to a borosilicate glass having improved hydrolytic resistance for preferred use in the pharmaceutical sector.

2. Description of Related Art

In the pharmaceutical sector, glass is widely used as a packaging material. In particular the special material properties thereof, such as high transparency, mechanical resistance, low permeability in combination with high chemical resistance are decisive for maintaining the quality of medicaments and thus the activity thereof.

The glass containers or primary packaging means for pharmaceutical purposes are generally in direct contact with a medicament present therein and are therefore subject to strict requirements. These are such that the contents can be withdrawn in a suitable manner, wherein at the same time losses as small as possible and no modification, preferably no physical or chemical effects on the contents, occur. The quality of the contents must not be modified by the direct contact with the container or primary packaging means such that the required limiting values are exceeded. In every case it must be ensured that the glass material does not release substances in amounts which could impair the stability of the medicament or even be toxic to the user.

In the case of aqueous-based medicaments, the most important property of a pharmaceutical primary packaging means made of glass is the resistance of the inner surface thereof which comes into contact with the aqueous-based medicament, and is attacked thereby. As a result, diverse ions can be extracted by dissolution from the glass surface. This can lead, for example, in the case of alkali metal and alkaline earth metal ions to a pH shift of the aqueous medium which lowers the activity of the medicament. Of the glass components, in addition, aluminium is suspected of being able to trigger damage to health in people having certain genetic predispositions, e.g. an increased aluminium uptake in metabolism. In order to exclude health risks, therefore, in general as few ions as possible should be extracted from the glass by dissolution.

Frequently used glasses for uses in the pharmaceutical sector are borosilicate glasses, what are termed neutral glasses, or soda lime-silicate glasses. The groups of usable borosilicate glasses is extremely extensive and usually comprises:

| | |
|---|---|
| $SiO_2$ | approximately 70 to 80% by weight |
| $B_2O_3$ | approximately 7 to 20% by weight |
| $Al_2O_3$ | approximately 2 to 7% by weight |
| Alkali metal oxide | approximately 3 to 10% by weight. |

Numerous glasses of this type have become known from the prior art. For instance, DE 37 22 130 A1 relates to a borosilicate glass which belongs to the first hydrolytic class as specified in DIN 12111, the first acid glass as specified in DIN 12116 and the second alkali glass as specified in DIN 52322, has a linear heat expansion between 20° C. and 300° C. of 4.3 to 5.0×10$^{-6}$ K$^{-1}$, a transformation temperature of 535 to 570° C., a processing temperature of 1140 to 1220° C. and a X-ray absorption at 0.6 Å of <5.20 cm$^{-1}$, and has the following composition:

| | |
|---|---|
| $SiO_2$ | 74.5 to 76.5% by weight |
| $B_2O_3$ | 10.0 to 12.0% by weight |
| $Al_2O_3$ | 3.5 to 6.0% by weight |
| $Na_2O$ | 6.0 to 8.0% by weight |
| CaO | 1.0 to 2.0% by weight |
| $ZrO_2$ | 0 to 0.50% by weight |
| F | 0 to 1.0% by weight, | wherein $As_2O_3$ and/or $Sb_2O_3$ and/or NaCl act as fining agents. In order to obtain minimum X-ray absorption, no $K_2O$, BaO or ZnO is present in this borosilicate glass. Some of the borosilicate glasses have relatively low coefficients of thermal expansion α(20° C.; 300° C.) and also relatively high processing temperatures. In addition, the glasses are more susceptible to crystallization because of the missing $K_2O$ content.

According to DE 44 30 710 C1, a low boric-acid borosilicate glass of high chemical resistance is disclosed having the following composition in % by weight on an oxide basis:

| | |
|---|---|
| $SiO_2$ | >75 |
| $B_2O_3$ | 1-<9 |
| $Al_2O_3$ | 3-6 |
| $Li_2O$ | 0-4 |
| $Na_2O$ | 0-8 |
| $K_2O$ | 0-6 |
| MgO | 0-3 |
| CaO | 0-3 |
| BaO | 0-2 |
| SrO | 0-2 |
| ZnO | 0-3 |
| $ZrO_2$ | 0-3 |
| $SnO_2$ | 0-3 |
| SnO | 0-3 |
| $TiO_2$ | 0-2 |
| $CeO_2$ | 0-2 |
| $Fe_2O_3$ | 0-1, where |
| $SiO_2 + B_2O_3$ | >83 |
| $SiO_2:B_2O_3$ | >8 |
| $SiO_2 + Al_2O_3 + ZrO_2$ | >83 |
| $Li_2O + Na_2O + K_2O$ | 5-10 |
| MgO + CaO + BaO + SrO + ZnO | ≤3. |

The boron oxide content of the glass is below the range according to the invention.

DE 100 25 465 C2 describes a low-lithium oxide borosilicate glass which has the following composition (in % by weight on an oxide basis):

| | |
|---|---|
| $SiO_2$ | 72.0-77.0 |
| $B_2O_3$ | 5.0-10.0 |
| $Al_2O_3$ | 3.0-7.0 |
| $ZrO_2$ | 0.1-3.0 |
| $Li_2O$ | 0.05-<0.5 |
| $Na_2O$ | 0-10.0 |
| $K_2O$ | 0-10.0 |
| ZnO | 0-8.0 |

-continued

| | |
|---|---|
| CaO | 0-5.0 |
| BaO | 0-5.0 |
| SrO | 0-5.0 |
| TiO$_2$ | 0-4.0 |
| SnO$_2$ | 0-3.0 |
| Fluorides | 0-3.0 |

Fining agents 0-2.0, under the conditions:

| | |
|---|---|
| Na$_2$O:K$_2$O | >0.75 |
| SiO$_2$:B$_2$O$_3$ | >7.5 |
| ΣSiO$_2$ + SnO$_2$ + Al$_2$O$_3$ + ZrO$_2$ | 80.0-83.0. |

The preferred K$_2$O content is 2.0 to 8.0. All glass compositions cited by way of example have either considerably more or no potassium oxide at all and are therefore not in the range required according to the invention.

In addition, DE 100 27 699 A1 relates to a zirconium oxide- and lithium oxide-containing borosilicate glass of high chemical resistance having the following composition (in % by weight on an oxide basis):

| | |
|---|---|
| SiO$_2$ | 71.5-74.5 |
| B$_2$O$_3$ | 8-11 |
| Al$_2$O$_3$ | 5-7 |
| Li$_2$O | 0.1-<0.5 |
| Na$_2$O | 5-6.5 |
| K$_2$O | 1.8-3 |
| MgO | 0-1 |
| CaO | 0-2 |
| where | |
| MgO + CaO | 0-2 |
| ZrO$_2$ | 0.5-2 |
| CeO$_2$ | 0-1 |
| F | 0-0.3, | and also optionally usual fining agents in usual amounts.

Thus the K$_2$O content, at 1.8 to 3% by weight, lies outside the range according to the invention and so the effects of the invention cannot be achieved. The alkali metal ion release of this borosilicate glass exhibits excessive values for glass containers in the pharmaceutical sector. In the case of the K$_2$O content cited, furthermore, the rate of evaporation is too high.

According to the disclosure of DE 102 38 915 B3, a borosilicate glass of high hydrolytic resistance is described which has the following composition (in % by weight on an oxide basis):

| | |
|---|---|
| SiO$_2$ | 70.5-<73 |
| B$_2$O$_3$ | 8-10 |
| Al$_2$O$_3$ | 4-5.6 |
| Li$_2$O | 0-<0.5 |
| Na$_2$O | 7-9 |
| K$_2$O | 1.2-2.5 |
| MgO | 0-1 |
| CaO | 0-2, |
| where | |
| MgO + CaO | 0-2 |
| BaO | >2-4 |
| ZrO$_2$ | 0-2 |
| CeO$_2$ | 0-1 |
| F | 0-0.6, | and also optionally usual fining agents in usual amounts.

Such a high BaO content of >2-4% by weight cannot be tolerated for primary packaging means in the pharmaceutical sector, in particular if aqueous medicaments are to be present, since sparingly soluble precipitates can form which modify the medicaments and make them unusable in general. Furthermore, these glasses having an aluminium oxide content of 4 to 5.6% by weight are more susceptible to crystallization than the glass composition according to the invention. Therefore, the described borosilicate glasses are not readily processable in a drawing process.

In addition DE 103 37 362 B4 describes an aluminium-free borosilicate glass having good chemical resistance having the following composition (in % by weight on an oxide basis):

| | |
|---|---|
| SiO$_2$ | 60-78 |
| B$_2$O$_3$ | 7-20 |
| Li$_2$O | 0-2 |
| Na$_2$O | 0-4 |
| K$_2$O | 3-12 |
| MgO | 0-2 |
| CaO | 0-2, |
| where | |
| MgO + CaO | 0-3 |
| BaO | 0-3 |
| ZnO | 0-2 |
| ZrO$_2$ | 0.8-12 |
| TiO$_2$ | 0-10 |
| CeO$_2$ | 0-1 |
| F | 0-0.6, | and also optionally usual fining agents in usual amounts.

This glass composition is aluminium-free and differs fundamentally from the borosilicate glass composition according to the invention.

DE 102 38 930 C1 discloses an aluminium-free borosilicate glass of good chemical resistance having the following composition (in % by weight on an oxide basis):

| | |
|---|---|
| SiO$_2$ | 65.0-77 |
| B$_2$O$_3$ | 7.0-20 |
| Li$_2$O | 0-2 |
| Na$_2$O | 0-4 |
| K$_2$O | 3.0-12 |
| MgO | 0-2 |
| CaO | 0-2, |
| where | |
| MgO + CaO | 0-3 |
| BaO | 0-3 |
| ZnO | 0-2 |
| ZrO$_2$ | 0.8-12 |
| TiO$_2$ | 0-5 |
| CeO$_2$ | 0-1 |
| F | 0-0.6, | and also optionally usual fining agents in usual amounts.

This glass composition is aluminium-free and again differs fundamentally from the glass composition according to the invention.

In addition, EP 0 765 847 A1 and also the parallel DE 195 36 708 C1 relates to a zirconium oxide- and lithium oxide-containing borosilicate glass of high chemical resistance and low viscosity having the following composition (in % by weight on an oxide basis):

| | |
|---|---|
| SiO$_2$ | 73.0-75.0 |
| B$_2$O$_3$ | 7.0-10.0 |
| Al$_2$O$_3$ | 5.0-7.0 |
| ZrO$_2$ | 1.0-3.0 |
| Li$_2$O | 0.5-1.5 |
| Na$_2$O | 0-10.0 |

-continued

| | |
|---|---|
| $K_2O$ | 0-10.0 |
| MgO | 0-3.0 |
| CaO | 0-3.0 |
| BaO | 0-3.0 |
| SrO | 0-3.0 |
| ZnO | 0-3.0 |
| Fluorides | 0-3.0, where |
| $SiO_2/B_2O_3$ | ≥7.5 |
| $\Sigma SiO_2 + Al_2O_3 + ZrO_2$ | 80.0-83.0 |
| $\Sigma MgO + CaO + BaO + SrO + ZnO$ | ≤3.0. |

The lithium oxide content exceeds the upper limit according to the invention in such a manner that the advantages of the invention cannot be obtained.

DE 198 42 942 A1 relates to a zirconium oxide- and lithium oxide-containing borosilicate glass of high chemical resistance having the following composition (in % by weight on an oxide basis):

| | |
|---|---|
| $SiO_2$ | 71-<73 |
| $B_2O_3$ | 7-10 |
| $Al_2O_3$ | 5.5-9 |
| $Li_2O$ | 0.5-2 |
| $Na_2O$ | 0-10.0 |
| $K_2O$ | 0-10.0, where |
| $Li_2O + Na_2O + K_2O$ | 0.5-10.5 |
| MgO | 0-2 |
| CaO | 0-3 |
| SrO | 0-3 |
| BaO | 0-3 |
| ZnO | 0-3, where |
| MgO + CaO + SrO + BaO + ZnO | 0-3 |
| $ZrO_2$ | 0.8-3 |
| $CeO_2$ | 0-1, | and also optionally usual fining agents in usual amounts.

The lithium oxide content cited exceeds the upper limit according to the invention, and so the advantages according to the invention cannot be obtained.

DE 20 2010 014 985 U1 describes a magnesium oxide containing borosilicate glass which has the following components (in % by weight on an oxide basis):

| | |
|---|---|
| $SiO_2$ | 71.5-78 |
| $B_2O_3$ | ≥10-12 |
| $Al_2O_3$ | ≥3-7 |
| $Na_2O$ | ≥6.5-8 |
| $K_2O$ | 0.5-2.0 |
| MgO | 1.5-1.9 |
| CaO | 0.3-1.0 |
| BaO | 0-0.5 |
| SrO | 0-0.5 |
| MgO + CaO + BaO + SrO | >2 |
| $ZrO_2$ | 0-1, | and also optionally usual fining agents in usual amounts.

This glass composition contains more than 2% by weight of the alkaline earth metal oxides, and so it is unsuitable as primary packaging means in the pharmaceutical sector, in particular for aqueous medicaments, on account of the higher amount of alkaline earth metal oxides.

U.S. Pat. No. 4,386,164 describes a barium-free type I, class B, laboratory glass as specified in ASTM E 438-80a having a linear expansion coefficient (0 to 300° C., cm/cm-° C.×10⁻⁷) of about 48 to 56, chemical resistance, a maximum titration equivalent of 0.2N $H_2SO_4$/10 g of glass of 1.0 ml, wherein the composition consists substantially of the following components in % by weight:

| | |
|---|---|
| $SiO_2$ | 70-74 |
| $B_2O_3$ | 9-13 |
| $Al_2O_3$ | 5-8 |
| $Na_2O$ | 5-8 |
| $K_2O$ | 0-4 |
| CaO | 0-3 |
| MgO | 0-1, | wherein the glass composition has an upper cooling temperature of about 550 to 585° C., a softening temperature of about 783 to 799° C., a liquidus temperature of about 1730 to 1760° F. and a log n at the liquidus temperature of about 5.0 to 5.5.

The effects achieved according to the invention are not described. In the exemplary embodiments, only $K_2O$ contents of 2.29% by weight and above are cited. Although the comparative composition described has 0.1 to 2.0% $K_2O$, it has a markedly excessive $Na_2O$ and CaO+MgO content, which is markedly higher than is allowable according to the invention. In addition, this comparative composition is portrayed as poor with respect to the properties thereof.

U.S. Pat. No. 3,942,992 discloses a chemically resistant glass which is substantially free from alkali metal oxides and $B_2O_3$ and exhibits a weight loss of no more than about 0.05 mgs/cm², when a 5% strength by weight HCl solution is exposed at 95° C. for 24 hours, and a weight loss of no more than about 0.5 mgs/cm², when a 5% strength by weight NaOH solution is exposed at 95° C. for 6 hours, and substantially consists of (calculated in cation percent on an oxide basis):

| | |
|---|---|
| $SiO_2$ | 59-70% |
| $Al_2O_3$ | 9-15% |
| BaO | 5-25% |
| CaO | 0-17% |
| ZnO | 0-7% |
| BaO + CaO + ZnO | 15-30% |
| $ZrO_2$ | 2-<5%. |

Although this glass composition is acid- and lye-resistant, the hydrolytic resistance is not mentioned and does not play a role. In addition, the presence of zirconium oxide is obligatory.

The above glasses are not designed especially as pharmaceutical primary packaging means, in particular to be used for medicaments on an aqueous basis. The purpose of the present invention is therefore to find a glass composition having a high resistance to attack by water, that is to say having a low release of ions to an aqueous-based medicament.

The object of the present invention, therefore, is to provide a glass having a glass composition which meets on a high level the requirements of glasses to be used in the pharmaceutical sector, and in particular exhibits a release of ions to an aqueous medium as low as possible, and therefore is preferably suitable for use with aqueous or water-containing medicaments.

SUMMARY

According to the invention, the object in question is surprisingly achieved by a borosilicate glass, preferably for use in the pharmaceutical sector, which has the following composition in % by weight, or consists thereof:

| | |
|---|---|
| SiO$_2$ | 71-77 |
| B$_2$O$_3$ | 9-12 |
| Al$_2$O$_3$ | 5.5-8 |
| Na$_2$O | 6-8 |
| K$_2$O | 0.1-0.9 |
| Li$_2$O | 0-0.3 |
| CaO | 0-1.5 |
| BaO | 0-1 |
| F | 0-0.3 |
| Cl- | 0-0.3 |
| MgO + CaO + BaO + SrO | 0-2. |

Of course, the components of the glass composition are selected in such a manner that they give 100% by weight in total.

It is surprising that a glass composition from the sector of borosilicate glasses which have long been known, have frequently been scientifically studied, and are widely used in practice, can be used in a specially modified form for achieving the above object.

Unexpectedly, it was observed that in the case of the glass compositions, by adjusting the potassium content in a relatively narrow range from 0.1 to 0.9% by weight, an unpredictable hydrolytic resistance of the glass compositions results. Surprisingly, glass compositions having an identical content of all of the other above cited components, but no potassium content, as well as glass compositions which have a potassium oxide content greater than 0.9% by weight, have a poorer, sometimes markedly poorer, hydrolytic resistance than the glass composition according to the invention having a potassium oxide content in the range from 0.1 to 0.9% by weight.

By maintaining the potassium oxide range according to the invention for the borosilicate glass of the present invention, not only is the total alkali metal release from the glass reduced, but also the release of all other ions, such as aluminium ions, is markedly reduced in comparison with known glasses of the prior art. Overall, for the borosilicate glass according to the invention, therefore, a markedly lower total ion release of the glass is observed than would be expected. This is of importance, in particular for use in the pharmaceutical sector, since extraction of ions from the glass by dissolution, on account of possible health risks, should be reduced as far as possible.

According to the invention, this is a relatively narrow range which is correlated with the unexpected effects: for instance, potassium oxide at proportions of 0.1% by weight and above, improves the hydrolytic resistance of the borosilicate glass. On account of the large ionic radius thereof, the potassium ions occupy the large gaps in the glass structure. In aluminium-containing borosilicate glasses, there are only relatively few thereof, and so the content of potassium ions should at the maximum be the cited upper limit of 0.9% by weight; the upper limit is therefore critical. Owing to the size thereof, the potassium ion is very firmly incorporated in the glass structure. However, if too much potassium is incorporated, the glass structure is stretched which leads to increased release, for example, of the smaller sodium and lithium ions, on contact with aqueous solutions. Accordingly, the cited upper limit of 0.9% by weight must in no event be exceeded.

In a preferred embodiment of the present invention the K$_2$O content is in the range from 0.1 to 0.88% by weight, more preferably in the range from 0.1 to 0.85% by weight, still more preferably in the range from 0.1 to 0.8% by weight, in particular in the range from 0.2 to 0.8% by weight. Very particularly advantageous results are obtained in the range from 0.2 to 0.75% by weight. However, it is generally sufficient for pharmaceutical primary packaging means if the K$_2$O content in the glass composition according to the invention is set in the range from 0.1 to 0.9% by weight.

In addition to the targeted reduction of the release of ions by the borosilicate glass of the present invention, the potassium present has the further advantage that the devitrification properties of the glass are improved.

A known disadvantage of potassium, however, is the greater tendency to vaporization compared with sodium. This is of importance, for example, in the high-temperature moulding of a glass container: if the glass contains an excessive potassium proportion, during the high-temperature moulding, what are termed lamp rings are formed to a greater extent. These are ring-shaped deposits of alkali metal borates which form above the base of a container, such as, for example, a vial (phial) or an ampoule. After production of the container, these alkaline metal borates devitrify during the subsequent cooling process, as a result of which the glass structure of the inner glass surface beneath these lamp rings is destroyed. As a consequence thereof, the damaged inner surface of the container can be leached during the sterilization process or by reaction with the medicament present, as a result of which the leached glass regions detach in a flake-like manner. If the potassium oxide content is set in the range according to the invention, this disadvantageous effect can be minimized, and no increased vaporization of alkali metal borates takes place.

In addition to the potassium oxide content which should be set according to the invention in the range cited, the other components of the glass composition also play a role. Within the ranges of composition, various sub-ranges can also be advantageous and therefore preferred.

For instance, the proportion of SiO$_2$ is according to the invention in the range from 71 to 77% by weight. SiO$_2$ is the base component for the glasses that are particularly resistant according to the invention for pharmaceutical primary packaging means. Preferably, the SiO$_2$ content is in the range from 72 to 77% by weight, still more preferably from 73 to 77% by weight, particularly preferably >74 to 77% by weight. Above 77% by weight, the melting temperature and the processing temperature markedly increase, in such a manner that the stated upper limit for the SiO$_2$ content is particularly critical and should be maintained.

The Al$_2$O$_3$ content in the glass composition according to the invention is 5.5 to 8% by weight, preferably 5.6 to 7.8, still more preferably 5.6 to 7.5% by weight, particularly preferably 6.0 to 7.2% by weight. Aluminium is incorporated as a network former and consolidates the entire glass structure. The gaps in the glass network for the cations become smaller thereby, but can still be filled by lithium ions and sodium ions. The tighter structure, on leaching by aqueous solutions, has a lower alkali metal release as a consequence. The addition of aluminium oxide furthermore improves the devitrification stability. However, since aluminium increases the melt temperature and the processing temperature, the usable fraction is restricted to 8% by weight.

According to the invention, B$_2$O$_3$ is used in the range from 9 to 12% by weight, preferably in the range from 10 to 12% by weight, still more preferably in the range from >10 to 12% by weight, in particular 10.5 to 11.5% by weight. The addition of boron oxide critically improves the hydrolytic resistance of the glass. Boron binds the alkali metal ions present more firmly into the glass structure. This composite is the basis for the preferred use of borosilicate glasses as pharmaceutical primary packaging means.

However, boron content >12% leads to increased vaporization during the base moulding of containers, in such a manner that the fraction in the glass is limited to a maximum of 12% by weight.

The sodium oxide content is according to the invention 6 to 8% by weight, particularly preferably 6.5 to 7.5% by weight. The alkali metal oxides play a role for establishing the thermal expansion (thermal expansion coefficient) and also the meltability and viscosity of the glass. The range according to the invention was observed to be advantageous.

Lithium is used in the glass composition according to the invention in the range from 0 to 0.3% by weight, preference is given to an $Li_2O$ content of 0 to 0.2, particularly preferably 0 to <0.2, especially preferably 0 to 0.15 and 0 to 0.12. Very particularly preferably, no lithium is present. Lithium has a very small ionic radius and occupies the smallest gaps in the glass structure. Only few are present thereof. If too many lithium ions are incorporated into the glass structure (>0.3% by weight), it also occupies the larger gaps in the network, from which, however, it can be more readily leached, and the hydrolytic resistance of the glass is lowered.

The calcium content in the glass according to the invention is in the range from 0 to 1.5% by weight, preferably 0.1 to 1.3% by weight, particularly preferably 0.2 to 1.0% by weight, especially preferably 0.3 to 0.8% by weight. Even small fractions of calcium improve the meltability of the glass, but make only a small contribution to increasing the alkali metal release. The addition of calcium makes the glass shorter, that is to say it increases the transformation and upper cooling temperatures, but lowers the processing temperature, and improves the acid resistance of borosilicate glasses. Calcium ions have the same diameter as sodium ions, and thus compete on incorporation for the same gaps in the glass structure. Since this gap size in the structure, however, is only present in a limited manner, in the event of an excessive supply of sodium ions and calcium ions, larger network gaps must also be occupied, from which sodium can be more readily leached, whereby the hydrolytic resistance is therefore impaired. Therefore, it is important to restrict the calcium fraction in the glass composition of the present invention to the said range.

Further alkaline earth metal oxides, such as MgO and/or SrO, can be present. In each case, the sum of MgO+CaO+BaO+SrO must be established in the range from 0 to 2% by weight in order to exclude a disadvantageous effect for the pharmaceutical sector.

Except for unavoidable contamination of the raw materials, the glass does not contain barium oxide, since barium oxide is not a component, the presence of which is obligatory in glass. However, the glass can have a barium oxide fraction of 0 to 1.0% by weight, preferably 0.1 to 1.0% by weight, since barium oxide improves the meltability of the glass and barium ions may only be leached out to a small extent from the glass structure. At contents above 1% by weight, barium oxide interacts undesirably with certain pharmaceutical active ingredients and can lead to destruction thereof. For example, sparingly soluble barium sulphate forms which can precipitate out and irreversibly modify the medicament.

Except for unavoidable contamination of the raw materials, the glass does not contain zirconium oxide, since zirconium oxide is not a component, the presence of which is obligatory in the glass. However, the glass can preferably have a zirconium oxide fraction of 0 to 2% by weight, still more preferably 0-0.1% by weight. In individual cases, a $ZrO_2$ content of <0.1% by weight has proved to be advantageous. The addition of $ZrO_2$ can improve the hydrolytic resistance. High fractions would increase the processing temperature too greatly, wherein the hydrolytic resistance is not substantially increased.

A further optional glass component is zinc oxide. This can be present according to the invention preferably in the range 0 to 0.6% by weight, preferably 0.1 to 0.5% by weight, particularly preferably 0.15 to 0.45% by weight. The glass composition can also be completely free from zinc oxide. Zinc oxide can, even in relatively low amounts, increase the crystallization stability of the borosilicate glass according to the invention.

The glass can be refined using usual fining agents such as, e.g. $CeO_2$, $Fe_2O_3$, $As_2O_3$, $Sb_2O_3$, $SnO_2$, chlorides, fluorides and sulphates, which—depending on the fining agent used—can be further present in the finished glass in usual amounts in the range 0.003% by weight (in the case of $As_2O_3$ and sulphates) to 0.6% by weight ($CeO_2$). If neither $As_2O_3$ nor $Sb_2O_3$ is used as fining agent, the glass is advantageously arsenic-free and antimony-free for use in pharmaceutical primary packaging means.

For the glass containers which are used in the pharmaceutical sector, it is generally required that they are sterilized before being filled. In addition to the known heat sterilization temperatures of about 250 to 300° C., or sterilization using superheated steam, sterilization using high-energy radiation (e.g. β-radiation, γ-radiation, strong UV radiation) is usable. However, the neutral glasses used, depending on the dose of radiation used, exhibit an unwanted yellow to brown coloration. In order to avoid this, for example, $CeO_2$ can be added to the glass composition according to the invention, which results in a radiation-stabilized glass that does not discolour during sterilization by high-energy radiation.

The expression "pharmaceutical primary packaging means" is to be understood as broadly as possible in the context of the invention and comprises any type, size and shape of glass container in the broadest sense. These may be taken to mean any type of hollow body made of glass which is closable and can be used in the pharmaceutical sector. Exemplary glass containers are bottles, in particular phials, vials, ampoules, carpules or syringes.

DETAILED DESCRIPTION OF THE INVENTION

The glasses of the present invention have advantageous properties which are required for their error-free and inexpensive mass production, in particular for production of pharmaceutical primary packaging means. They meet the necessary conditions of melting behaviour, crystallization stability, fining properties and processability.

Advantageously, the glasses according to the invention have a thermal expansion coefficient $\alpha_{20/300}$ in the range from $4.8\times10^{-6}$/K to $5.6\times10^{-6}$/K. As is known, the thermal expansion, apart from being able to be set via the amount of alkali metal oxides present, may also be set via the selection of the alkali metal oxides used. Therefore, according to the invention, the desired range is successfully provided.

A parameter for characterizing the processability of glass is the processing temperature at which the viscosity of the glass is $10^4$ dPas, what is termed the processing temperature $V_A$. This processing temperature, for pharmaceutical ampoule glass, is preferably not more than about 1220° C. to 1230° C. By this means, in the production of tubes, and in the subsequent further processing of the tubes to form ampoules, disadvantageous vaporization of certain glass components, such as alkali metal oxides and boric acid, can be lowered to a minimum or prevented. These vaporization products form precipitates in the glass containers produced from tubes and have disadvantageous effects on the hydrolytic resistance. The vaporizations occurring during the hot shaping of the glass can even lead to unusability of the glass container. A lower processing temperature therefore means that a vaporization that occurs, in particular of alkali metal borates, during shaping of the alkali metal-containing borosilicate glasses according to the invention, is as small as possible.

At the same time, a low processing temperature leads to lower energy costs. A lower processing temperature further means a lower melting temperature and thereby a decrease in the production costs. According to the invention, the processing temperature $V_A$ is in the range from about 1140 to 1180° C. and thereby meets the corresponding conditions.

In addition, for the alkali-metal containing borosilicate glasses, it has been observed that the viscosity in the entire melting, processing and cooling region is not excessively high; this is advantageous with respect to the quality of the glass to be achieved and the resulting costs.

The invention also relates to the use of the borosilicate glass according to the invention in the pharmaceutical sector, in particular as pharmaceutical primary packaging means, preferably for aqueous or water-containing medicaments.

In the context of the invention, "aqueous or water-containing medicament" is taken to mean any type of medicament active ingredient, also mixtures of a plurality of medicament active ingredients which has/have water.

"Aqueous medicament" is taken to mean a medicament, the main component of which is water. For example, water can be the main component of a dispersion medium in which the medicament active ingredients are present in dispersed form. For example, an aqueous solution can be present in which the medicament active ingredient is present in dissolved form, such as, for example, an injection solution.

"Water-containing medicament" is taken to mean a medicament, the main component of which is not water. For example, this can be a water-containing medium, for example, a solvent, which has a fraction of water and other solvents such as, e.g. alcohol, in which the one or more medicament active ingredients are present in dispersed or dissolved form.

The aqueous or water-containing medicament can be present in liquid form. However, this need not be so in every case. Semi-solid or solid medicament formulations are also usable.

The present invention also relates to pharmaceutical primary packaging means which consist of the glass according to the invention.

The advantages of the borosilicate glass according to the invention are extraordinarily multifaceted.

Owing to the specifically set content of potassium oxide in the borosilicate glass composition according to the invention, a minimum is attained for the total alkali metal ion release and, in addition, a markedly reduced total ion release is obtained, from which an outstanding hydrolytic resistance of the glass results. It is particularly noteworthy that the aluminium ion release can also be markedly lowered compared with known glasses, and so health risks in this regard are minimized.

Thus, the borosilicate glasses according to the invention are particularly suitable for producing pharmaceutical primary packaging means. These are glasses which are particularly well suited for the pharmaceutical sector and which are producible industrially of sufficiently high quality economically. These are readily meltable and drawable and may be drawn, in particular into tubes, for example by the Danner-tube drawing process that is preferably used. Pharmaceutical containers or primary packaging means made of glass are usually fabricated from glass tubes by hot forming, and so the production of glass tubes becomes of particular importance.

The borosilicate glasses according to the invention therefore, in addition to a high chemical resistance, have a suitable hydrolytic resistance, they are sufficiently crystallization stable, and have only a low devitrification tendency.

The glasses have low thermal expansion coefficients $\alpha_{20/300}$, which leads to a good temperature-change resistance.

Low processing temperatures $V_A$ in the range from about 1140 to 1180° C. show the good processability of the glasses.

Therefore, the glasses according to the invention have good material properties which make them particularly suitable for use in the pharmaceutical sector. Good production and processing properties and a low devitrification tendency permit economic production even on an industrial scale.

With their properties, the borosilicate glasses according to the invention are therefore outstandingly suitable for use as pharmaceutical primary packaging means, such as phials or ampoules. The medicaments kept in the containers, in particular aqueous or water-containing medicaments, such as aqueous solutions, for example injection solutions, do not attack the borosilicate glass significantly, in such a manner that the glass releases no or very few ions.

Hereinafter, the present invention will be described with reference to examples which illustrate the teaching according to the invention but are not intended to restrict it thereto.

EXAMPLES

From the glass composition range according to the invention, 5 exemplary embodiments were selected by way of example and tubes or tube sections produced. Pharmaceutical containers made of glass are usually fabricated by hot forming from glass tubes, and so it is expedient to examine precisely the glass tubes for their fitness and quality with respect to use in the pharmaceutical sector.

The glasses were produced as follows: For production of the example glasses and the comparative glasses, the tube material was fused in a Pt crucible at a temperature of 1600° C. for several hours, refined with chloride (Example C4 with addition of antimony oxide) and homogenized. Then, the glass was drawn vertically into tubular form in a laboratory drawing system.

In Table 1 shown hereinafter, the respective compositions (in % by weight on an oxide basis), the thermal expansion coefficient $\alpha_{20/300}$ [$10^{-6}$/K], the transformation temperature Tg [° C.] and the processing temperature $V_A$ [° C.] are cited.

In addition, Table 2 presented hereinafter cites the hydrolytic resistance on the basis of the sodium release as specified in ISO 4802-2 [μg of $Na_2O/cm^2$ of glass surface area], the potassium release as specified in ISO 4802-2 [μg of $K_2O/cm^2$ of glass surface area], the total alkali metal release as specified in ISO 4802-2 [μg of alkali metal oxide/$cm^2$ glass surface area], the aluminium release by analogy with ISO 4802-2 [μg of $Al_2O_3/cm^2$ of glass surface area] and the total ion release by analogy with ISO 4802-2 [μg of Σoxides of the components/$cm^2$ of glass surface area] of the glasses.

The hydrolytic resistance, represented by the ion release for individual glass components or for all glass components present or oxides of the glass (inner) surface was determined as follows:

In order to examine the hydrolytic resistance of the inner surface of a glass container, a procedure was followed on the basis of the known standard ISO 4802-2 (ISO 4802-2:2010 (E)). The hydrolytic resistance is established in this case by determining the ion release of the inner surface of glass containers, wherein in addition to the alkali metal and alkaline earth metal ions that are extracted by dissolution in water that are determined in ISO 4802-2, according to the invention aluminium ions and all other ions extracted from the glass by dissolution were determined. The measurement of aluminium and total ion release therefore proceeded by analogy with ISO 4802-2.

According to ISO 4802-2, the glass containers are exposed to steam in an autoclave. The autoclave in this case is used for sterilizing medical instruments, wherein the air in the autoclave is displaced by steam. The containers under test during autoclaving are charged with a predefined volume of distilled water or water of equivalent purity (quality grade 3 in accordance with ISO 3696, as cited in ISO 4802-2:2010(E)). Substantially, in this case, after heating up the autoclave to 100° C., the temperature is increased by 1° C. per minute from 100° C. to 121° C., and held at this temperature for about 60 min. The ionic concentrations released by the glass container into the water present during the autoclaving are then determined in corresponding analytical methods.

In the present exemplary embodiment—as already explained—glass tubes were tested, which can serve as starting products for producing the corresponding glass containers or primary packaging means. In contrast to ISO 4802-2, which is actually a standard for pharmaceutical containers, here tube sections were used. Two pieces of 150 mm long tube sections were taken in each case from the centre of a 1.5 m long tube. The tube diameters used were in the range from 10 to 16 mm. For each exemplary embodiment (example according to the invention or comparative example) in each case 10 tube sections were studied in order to harmonize possible variations in the values. The values cited are the means from 10 measurements.

In order to take into account the size of the inner surface area of the glass tube section, the measured values obtained were expressed in ion release per $cm^2$ of glass surface area (see Table 2).

The sample preparation, in particular the cleaning, charging and autoclaving conditions, were carried out as described for the glass containers described in detail in ISO 4802-2.

The tube sections that were open on both ends were, however, in order to be able to fill them with water, closed with a stopper at one end before the autoclaving process, and provided on the other end with an additional covering. In order to avoid contaminations with the components present in the glass, the respective materials for the stopper and the covering were selected in such a manner that they contain none of the glass components that are to be determined. For example, when aluminium ions are being determined, no aluminium foil was used for covering, but, for example, tin foil; if the samples were tested for silicon ions, no silicon stoppers were used, but another material such as, for example, a stopper made of Viton®, a fluoroelastomer from DuPont.

Therefore, glass tube sections having glass compositions according to the invention (exemplary embodiments according to the invention) were compared with glass tube sections of similar glass composition (comparative examples) but which did not have a potassium oxide content set according to the invention.

The extraction solutions were therefore analyzed for the individual elements or ions as cited in ISO 4802-2, but for determination of the Si, B, Ca, Ba, Al and Na content, an inductively coupled plasma-optical emission spectrometry method (ICP-OES method) was used and for determination of the potassium content, an inductively coupled plasma-mass spectrometric method (ICP-MS method) was used. The analytical methods to be used as specified in ISO 4802-2 flame atomic absorption spectrometry or flame atomic emission spectrometry (flame-AAS or flame-AES) are insufficiently sensitive or unavailable for the elements in the eluate that are to be determined. Further possible glass components which are not explicitly present in the examples can readily be determined by those skilled in the art on the basis of their general expert knowledge using known analytical methods.

TABLE 1

Compositions (all data in % by weight) and physical properties of the exemplary embodiments (A) and the comparative examples (C)

| Component | Name | | | | | | | | | |
|---|---|---|---|---|---|---|---|---|---|---|
| | C1 | C2 | A1 | A0 | A2 | A3 | A4 | C3 | C4 | C5 |
| $SiO_2$ | 75.5 | 74.1 | 75.5 | 74.3 | 73.9 | 74.3 | 75.9 | 73.9 | 72.1 | 74.3 |
| $B_2O_3$ | 10.4 | 11.0 | 10.4 | 10.7 | 11.0 | 10.4 | 10.5 | 10.4 | 10.3 | 9.2 |
| $Na_2O$ | 7.2 | 7.5 | 6.5 | 7.4 | 7.4 | 7.3 | 6.6 | 6.9 | 6.3 | 6.8 |
| $K_2O$ | 0.0 | 0.0 | 0.15 | 0.28 | 0.50 | 0.70 | 0.81 | 1.1 | 2.0 | 2.3 |
| $Al_2O_3$ | 5.5 | 6.7 | 5.5 | 6.7 | 6.7 | 6.7 | 5.6 | 6.4 | 7.2 | 6.7 |
| CaO | 1.4 | 0.7 | 1.25 | 0.62 | 0.50 | 0.60 | 0.59 | 1.3 | 0.8 | 0.7 |
| BaO | 0.0 | 0.0 | 0.70 | 0.0 | 0.0 | 0.0 | 0.0 | 0.0 | 1.3 | 0.0 |
| Sum | 100.0 | 100.0 | 100.0 | 100.0 | 100.0 | 100.0 | 100.0 | 100.0 | 100.0 | 100.0 |
| $\alpha_{20/300}$ [$10^{-6}$/K] | 4.88 | 4.97 | 4.8 | 5.05 | 5.2 | 5.12 | 4.86 | 5.53 | 5.42 | 5.52 |

TABLE 1-continued

Compositions (all data in % by weight) and physical properties of the exemplary embodiments (A) and the comparative examples (C)

| Component | Name | | | | | | | | | |
|---|---|---|---|---|---|---|---|---|---|---|
| | C1 | C2 | A1 | A0 | A2 | A3 | A4 | C3 | C4 | C5 |
| $T_g$ [° C.] | 561 | 552 | 550 | 552 | 550 | 553 | 549 | 554 | 563 | 567 |
| $V_A$ [° C.] | 1163 | 1169 | 1177 | 1166 | 1165 | 1172 | 1142 | 1153 | 1174 | 1176 |

TABLE 2

Measured ionic release for the compositions of Table 1

| Name | C1 | C2 | A1 | A0 | A2 | A3 | A4 | C3 | C4 | C5 |
|---|---|---|---|---|---|---|---|---|---|---|
| Sodium release as specified in ISO 4802-2 [µg of $Na_2O/cm^2$ of glass surface area] | 0.17 | 0.17 | 0.155 | 0.14 | 0.14 | 0.14 | 0.14 | 0.15 | 0.16 | 0.16 |
| Potassium release as specified in ISO 4802-2 [µg of $K_2O/cm^2$ of glass surface area] | 0 | 0 | 0 | 0 | 0 | 0 | 0.01 | 0.02 | 0.02 | 0.03 |
| Total alkali meta release as specified in ISO 4802-2 [µg of alkali metal oxide/$cm^2$ of glass surface area] | 0.17 | 0.17 | 0.155 | 0.14 | 0.14 | 0.14 | 0.15 | 0.17 | 0.18 | 0.19 |
| Aluminium by analogy of ISO 4802-2 [µg of aluminium oxide/$cm^2$ of glass surface area] | 0.12 | | | | 0.04 | 0.03 | | | 0.06 | 0.09 |
| Total ion release by analogy with ISO 4802-2 [µg of Σ oxides of components/$cm^2$ of glass surface area] | 1.50 | | | | 1.1 | 1.0 | | | 1.7 | 1.5 |

The total ion release according to Table 2 results from the glass composition used, according to which analysis is performed for all components (ions) present in the glass which are released into water, and the amount thereof is determined qualitatively by the analytical methods described.

From the results it can be seen that when the potassium oxide content of the borosilicate glasses is set in the range according to the invention, an unexpectedly good hydrolytic resistance of the glass inner surface is achieved. The values for Examples A0 to A4 according to the invention are below, in part markedly below, the comparative Examples C1 to C5. This applies, surprisingly, not only to the alkali metal ions per se but also to the aluminium ion release, and also the total ion release which was able to be markedly reduced in comparison with the comparison glasses.

Figure 1:
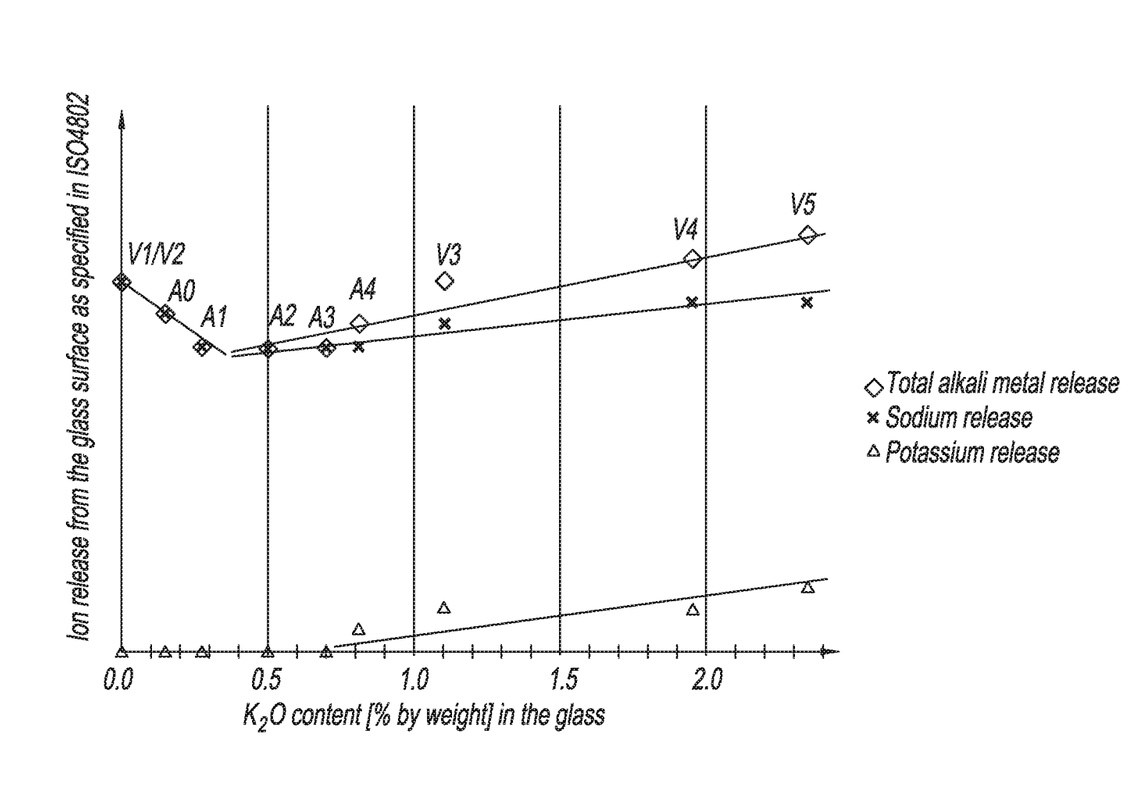
The sole FIGURE is a graph that illustrates results obtained for sodium, potassium and total alkali metal release in diagrammatic form.

The results obtained for the sodium, potassium and total alkali metal release were shown in diagrammatic form in the sole FIGURE. The alkali metal ion release found of the glass inner surface as specified in ISO 4802-2 (y-axis) was plotted against the potassium oxide content [% by weight] in the borosilicate glass according to the invention (x-axis). The FIGURE therefore contains three different curves, namely the course of sodium, potassium and total alkali metal release in dependence on the $K_2O$ content in the glass.

The FIGURE makes the following clear: with increasing potassium oxide content, the amount of release of sodium ions on testing as specified in ISO 4802-2 first decreases. At the same time, however, the potassium ion release increases with increasing potassium content in the borosilicate glass. Surprisingly, the potassium ion release, however, only increases markedly from a potassium content of greater than 0.9% by weight, and so in the sum of the total alkali metal release in the range from 0.1 to 0.9% by weight, advantageous results are achieved. Particularly advantageous is the range from 0.1 to 0.85% by weight, and in particular the range from 0.2 to 0.8% by weight and very particularly advantageous results are achieved in the range from 0.2 to 0.75% by weight, in which a minimum for the total alkali metal release was even observed.

The results show that the alkali metal-containing borosilicate glasses according to the invention are suitable for the preferred use as primary packaging means in the pharmaceutical sector and, in particular, can be used for aqueous or water-containing medicaments.

Using the present invention therefore, borosilicate glasses are provided which are outstandingly suitable for the use as pharmaceutical primary packaging means, such as phials or ampoules. In particular, the aqueous or water-containing medicaments that are kept in the containers do not attack the glass significantly, and so the borosilicate glass according to the invention releases no, or only few, ions.

What is claimed is:

1. Borosilicate glass comprising the following components in % by weight:

| | |
|---|---|
| $SiO_2$ | 71-77; |
| $B_2O_3$ | 10.4-12; |
| $Al_2O_3$ | 6.5-8; |
| $Na_2O$ | 6.5-8; |
| $K_2O$ | 0.1-0.9; |
| $Li_2O$ | 0-0.3; |
| CaO | 0-1.5; |
| BaO | 0-1; |

-continued

| | |
|---|---|
| F | 0-0.3; |
| Cl- | 0-0.3; and |
| MgO + CaO + BaO + SrO | 0-2. |

2. The borosilicate glass according to claim 1, wherein the $K_2O$ content is in the range from 0.1 to 0.88% by weight.

3. The borosilicate glass according to claim 1, wherein the $K_2O$ content is in the range from 0.2 to 0.75% by weight.

4. The borosilicate glass according to claim 1, wherein the $SiO_2$ content is in the range from 72 to 77% by weight.

5. The borosilicate glass according to claim 1, wherein the $SiO_2$ content is in the range from >74 to 77% by weight.

6. The borosilicate glass according to claim 1, wherein the $Al_2O_3$ content is 7.2 to 8% by weight.

7. The borosilicate glass according to claim 1, wherein the $Al_2O_3$ content is 6.7 to 7.2% by weight.

8. The borosilicate glass according to claim 1, wherein the $B_2O_3$ content is in the range from 10.5 to 11.5% by weight.

9. The borosilicate glass according to claim 1, wherein the $Li_2O$ content is in the range from 0 to 0.2% by weight.

10. The borosilicate glass according to claim 1, wherein the $Li_2O$ content is 0.

11. The borosilicate glass according to claim 1, wherein the CaO content is in the range from 0.1 to 1.3% by weight.

12. The borosilicate glass according to claim 1, wherein the CaO content is in the range from 0.3 to 0.8% by weight.

13. The borosilicate glass according to claim 1, wherein the BaO content is in the range from 0.1 to 1.0% by weight.

14. The borosilicate glass according to claim 1, wherein the $ZrO_2$ content is in the range from 0 to 2% by weight.

15. The borosilicate glass according to claim 1, wherein the $ZrO_2$ content is 0.

16. The borosilicate glass according to claim 1, wherein the ZnO content is in the range from 0 to 0.6% by weight.

17. The borosilicate glass according to claim 1, wherein the ZnO content is in the range from 0.15 to 0.45% by weight.

18. The borosilicate glass according to claim 1, further comprising characterized a thermal expansion coefficient $\alpha_{20/300}$ is in the range from $4.8 \times 10^{-6}$/K to $5.6 \times 10^{-6}$/K.

19. The borosilicate glass according to claim 1, wherein the glass is free from $As_2O_3$ and $Sb_2O_3$ except for unavoidable impurities.

20. A tube comprising the borosilicate glass according to claim 1 that is drawn using a Danner drawing process.

21. A pharmaceutical primary packaging device comprising the borosilicate glass according to claim 1.

22. The borosilicate glass according to claim 1, wherein the CaO content is in the range of 0 to 0.3% by weight and the $B_2O_3$ content is in the range of 11.5 to 12% by weight.

* * * * *